Feb. 12, 1929.
J. M. CROWE
1,701,948
PORTABLE SAW
Filed April 2, 1925
2 Sheets-Sheet 1
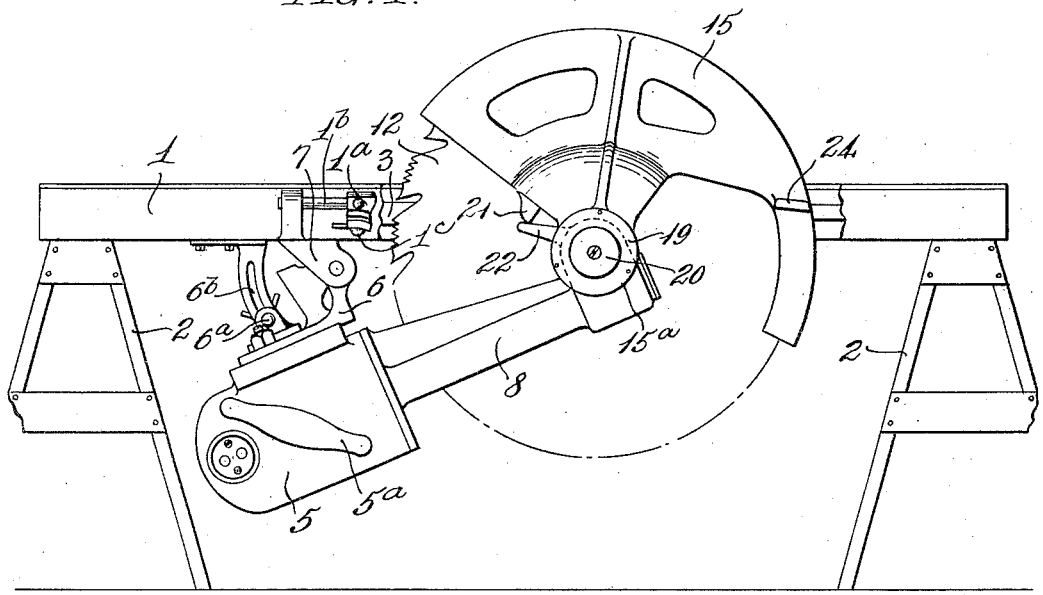
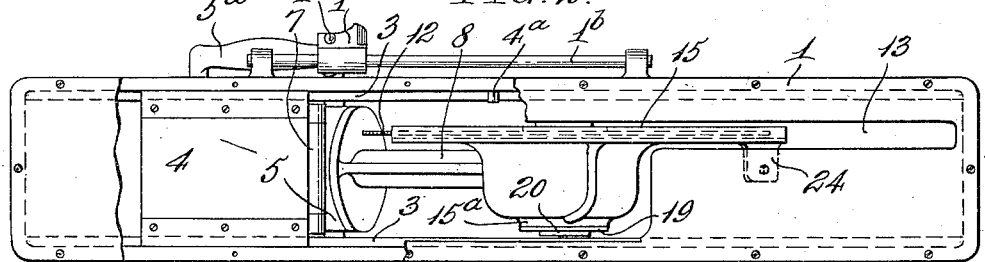
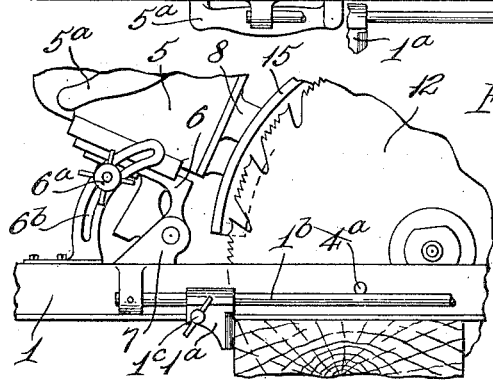
Inventor
John M. Crowe
By Brockett, Hyde & Milburn
Attorneys Feb. 12, 1929.
J. M. CROWE
1,701,948
PORTABLE SAW
Filed April 2, 1925
2 Sheets-Sheet 2
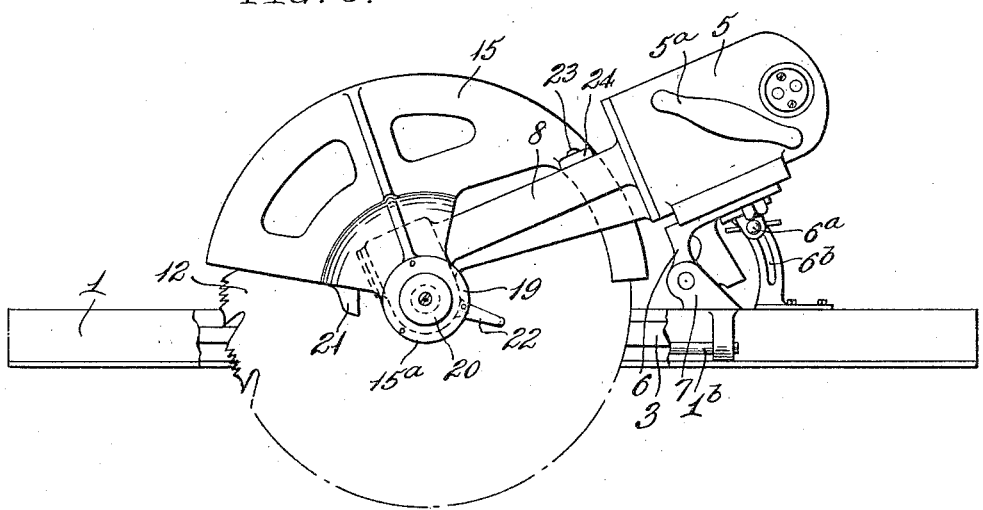
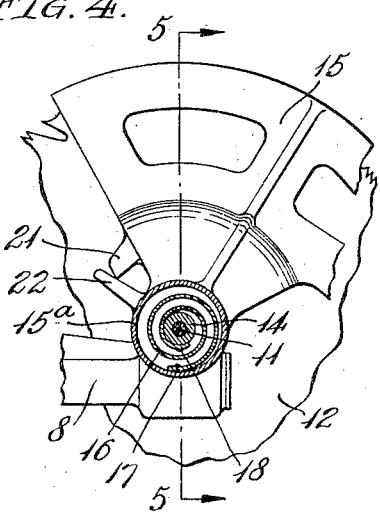
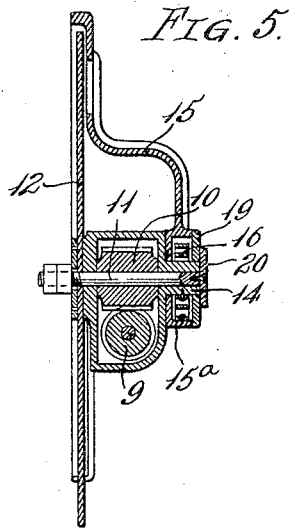
Inventor
John M. Crowe
By Brockett Hyde & Milburn
Attorneys Patented Feb. 12, 1929.

1,701,948

UNITED STATES PATENT OFFICE.

JOHN M. CROWE, OF COVINGTON, KENTUCKY, ASSIGNOR TO THE CROWE MANUFACTURING CORPORATION, OF COVINGTON, KENTUCKY, A CORPORATION OF KENTUCKY.

PORTABLE SAW.

Application filed April 2, 1925. Serial No. 20,114.

This invention relates to improvements in portable motor driven saws.

The type of saw to which the present invention relates comprises a frame structure upon which there is mounted for slidable movement therealong a carriage which supports an electric motor and a rotatable saw blade together with operating connections therebetween. In this particular case, the motor together with the saw blade, hereinafter referred to merely as the blade, and the operating mechanism are pivotally mounted upon the carriage so that the saw as a unit may be tilted to various positions as the blade is moved through the work during the sawing operation or so that it may be set for cutting grooves of various depths.

The present invention involves also the idea of employing such a frame and saw structure in two different manners; first, as a hand tool, in which case the frame will be placed upon the work and the blade moved therealong as it passes through the work; and second, as a table saw in which case the whole structure will be supported in an inverted position with the frame supported upon any suitable means of support as for instance, carpenter's horses or the like and the work then fed to the blade.

It is, of course, most desirable to have some means of guarding or protecting the hands of the operator against likely danger of being cut by the blade and it is therefore the object of the present invention to provide such a duplex type of saw together with a single guard means which can be employed in connection with the saw when used in either of the two manners above described.

It is a further object of this invention to provide for securing such a guard means in fixed position during the time when the tool is employed as a hand tool so as to maintain the guard in upper position and out of the path of the saw blade while it is being moved through the work.

Another object consists in providing automatic means which normally tend to move the guard to closed or guarding position when the saw occupies inverted position for use as a table saw, but which automatic means will at the same time permit the guard to recede in advance of the work as it is moved into the saw when used as a table saw. In this way the guard will be caused to recede or disappear below the frame structure as the work is moved through the saw and will automatically return to guarding position upon completion of the sawing operation.

More specifically, it is the object to provide a spring means for controlling the action of the guard in the manner just now described and to provide also a housing for the spring so as to prevent interference of sawdust or other foreign matter with the operation of the spring.

Another object is to provide a stop means for limiting the movement of the guard when it is released to the action of the spring.

A still further object is to provide the frame structure with a restricted slot through which the blade may pass, the remaining portion of the frame being substantially closed so as to afford a maximum bearing surface of the frame structure upon the work.

In the drawings, Fig. 1 is a side elevation of my improved saw arranged in inverted position for use as a table saw; Fig. 2 is a plan view of the same; Fig. 3 shows in elevation the same saw structure occuying upright position for use as a hand tool; Fig. 4 is a detail view showing the arrangement of the guard and coil spring for controlling the same as well as stops therefor; Fig. 5 is a sectional view on line 5—5 of Fig. 4, and Fig. 6 is a further detail view on the side opposite to Fig. 3.

The frame structure 1, which is adapted to be supported upon the easels or horses 2 at the two ends thereof, is provided with the slideways 3 along the two sides for sliding movement of the carriage 4 upon which is mounted the casing 5 enclosing an electric motor. A pivotal connection is provided for the motor casing by means of the bracket 6 which is pivotally mounted upon the bracket 7 on the carriage 4. The auxiliary casing 8, which extends from the motor casing, encloses the drive shaft from the motor to the gear 9 which meshes with and drives the gear 10 on the shaft 11 of the blade 12. The bottom of the frame structure 1 is practically entirely closed, as indicated in Fig. 2, except for the comparatively restricted slot 13 which permits passage of the blade therethrough for the sawing operation. This particular feature affords greater bearing or surface engagement of the frame with the work so as to permit the sawing operation at or near the end of a piece of work, which would otherwise be impossible due to the unsteadiness of the saw frame upon the work.

The lugs 1ª which are of cloven form are adapted to be turned to either of two positions on rods 1ᵇ, as shown in Figs. 1 and 6, and are held in such positions by means of clamping screws 1ᶜ.

The shaft 11 is supported in its one end in the bearing portion 14 provided on the housing 8, which portion 14 affords a bearing or support for the housing 15ª formed as the hub of the guard 15. The housing 15ª serves to enclose a coil spring 16 the one end of which is anchored at the point 17 to the housing 15ª, while the other end of the spring is secured at the point 18 to the bearing portion 14. The plate 19, which is secured by screws to the open side of the housing 15ª, serves as a covering therefor, and a cap or plate 20 is secured to the housing end of the shaft 11 which rotates in the bearing portion 14.

When used as a table saw, the lugs 1ª are set in position shown in Fig. 1 so as to be out of the way. Also, the screw clamp 6ª carried by the bracket 6, may be tightened in the arcuate slot 6ᵇ so as to hold the saw in the proper angular position in which it is set. The carriage 4 will be prevented from sliding along the frame by engagement with the pin 4ª, that is, during the sawing operation.

The work is introduced at the left, as viewed in Fig. 1, and moved toward the right, the engagement of the work with the near edge of the guard serving to rotate the guard about the axis of the blade in a clock-wise direction so as to recede ahead of the work as it is moved along the frame. The guard will disappear entirely below the frame if the work is moved sufficient distance through the saw as to permit free movement of the work along the frame. Then upon withdrawal of the work or upon completion of the sawing operation, the guard will automatically be returned to the position shown in Fig. 1, that is, will be rotated back in a counter-clockwise direction by the force of the spring to the position shown in Fig. 1 so as to guard the operator or any one else against danger from engagement with the blade edge. The tendency of spring 16 is to move the guard to the position indicated in Fig. 1 which is determined by engagement of the stop 21 on the guard itself with stop 22 on the casing 8.

Then in order to employ the tool as a hand tool, that is, when the saw is moved along the frame and through the work by the operator, the entire structure is inverted so as to occupy upright position as indicated in Figs. 3 and 6. The frame is then placed against the work by the engagement of the lugs 1ª or any other suitable means carried upon the underside of the frame, the lugs 1ª having been set and clamped in position shown in Fig. 6, and the operator gripping the handles 5ª, shown disposed on the side of the motor casing at an angle of approximately 45°, will slide the carriage with the motor and blade along the frame with the saw inclined downwardly to sufficient extent to engage the edge of the work for the sawing operation. The degree to which the saw is inclined will be varied according to the depth of cut desired or the thickness of the work which is being sawed. When the saw is used in this manner the guard is rotated about the axis of the blade to the position indicated in Fig. 3 and is secured or clamped in such position by means of the screw 23 which clamps the lugs 24 on the guard in engagement with the housing 8. This clamping engagement is a releasable one so that it may be removed when it is desired to employ the saw as a table saw in the manner already described. Thus while using the tool as a hand tool, the guard occupies position above the frame or, in other words, guards the upper part of the blade and thereby protects the hands of the operator against accident.

The inclination of handles 5ª enables the operator to grip the same in the most convenient manner for controlling the movements of the saw and motor with the highest possible degree of efficiency both with respect to the sliding movement of the motor and saw along the frame and the tilting movement of the saw.

Thus it will be seen that I have devised a comparatively simple and compact saw structure which is capable of a two-fold use and is readily and quickly convertible from one to the other. At the same time I have provided such a saw structure with a single and comparatively simple guard which is capable of adjustment so as to be utilized in connection with the tool when used either as a hand tool or table tool. And, finally the structure and arrangement of all the parts, including the angularly disposed handles, greatly facilitate its manipulation by the operator.

What I claim is:

The combination of a readily portable frame capable of being applied to and moved upon the work by the operator, a circular saw and means for driving the same mounted on one side of the frame, the saw projecting through the frame to the other side so that the frame may provide a shoe to travel with the saw upon the work when the device is moved by hand and a table when the frame is fixedly supported, a guard for the saw movable to project over the saw beyond one side of the table frame or to the other side of the frame, means for yieldingly holding the guard in the former position projecting up from the table and means for rigidly securing it in the latter position.

In testimony whereof I hereby affix my signature.

JOHN M. CROWE.